April 10, 1951  G. W. COOK  2,547,926
ELECTRONIC STRAIN MEASURING SYSTEM
Filed Dec. 27, 1946  3 Sheets-Sheet 2

INVENTOR.
George W. Cook
BY
*M. Hayes*
ATTORNEY

April 10, 1951 G. W. COOK 2,547,926
ELECTRONIC STRAIN MEASURING SYSTEM
Filed Dec. 27, 1946 3 Sheets-Sheet 3

INVENTOR.
George W. Cook
BY
M. C. Hayes
ATTORNEY.

Patented Apr. 10, 1951

2,547,926

UNITED STATES PATENT OFFICE 2,547,926

ELECTRONIC STRAIN MEASURING SYSTEM

George W. Cook, Washington, D. C.

Application December 27, 1946, Serial No. 718,731

11 Claims. (Cl. 73—88.5)

(Granted under the act of March 3, 1883, as amended April 30, 1928; 370 O. G. 757)

This invention relates to improvements in electronic instruments for measuring strain in materials and structures and for solving other measurement problems.

Wire resistance strain gages such as shown in Patent 2,292,549 granted to Simmons, Jr., are extensively used in the measurement of surface strain in structural members. These gages each comprising a grid of fine wire cemented on thin paper, are easily put into use by cementing the paper base to the surface of the material in the zone where the strain is to be measured. The gage operates on the principle that a change in its length produces a proportional change in its electrical resistance. If the gage is part of a suitable electrical circuit, these changes in length and resistance may be resolved in terms of strain in the material under observation in the zone where the gage is mounted.

While the wire resistance type of gage faithfully indicates the magnitude of strain due to stress in a specimen by a corresponding change in resistance, it also indicates strain when the surface on which it is mounted undergoes a dimensional change from any other cause, such as normal expansion or contraction due to changes in temperature of the specimen. Spurious indications of this nature can be largely offset by the simple expedient of using the gage in a Wheatstone bridge circuit. A second gage, exactly like the first, is placed electrically in the circuit so that the active gage and the second gage form adjacent arms in the bridge. The second or compensating gage must be mounted on the specimen or on a similar specimen which is exposed to the same temperature effects. In this way the compensating gage is subjected to the same spurious changes as the active gage, but not to the strain being measured.

In special cases where strain due to bending in a plate or bar is to be measured, the compensating gage may take an active part in the measurement by being mounted directly opposite the first gage on the reverse surface of the material. The resistance changes in this case are additive for the two gages, for the measurement of bending moments. All longitudinal strain indications, as well as temperature expansion effects, are cancelled. From the standpoint of practicing accurate strain measurement technique, it is highly desirable to measure strain produced by bending whenever possible. In some types of strain measurements it is expedient to mount gages in multiple series-parallel arrangements; i. e., with groups of four gages connected to serve as one.

An important object of the present invention is to provide an electronic instrument suitable for measuring and recording static and dynamic strains by means of strain gages of the wire resistance type.

Another object is the provision of an improved alternating current bridge circuit having means for balancing the bridge for both resistance and reactance.

A further object is to provide an improved system for calibrating the strain-measuring apparatus.

A still further object is the provision of an improved modulated carrier wave system for measuring strain.

Other objects and advantages of the invention will become apparent during the course of the following description, taken in connection with the accompanying drawings, forming a part of this specification, and in which drawings.

GENERAL DESCRIPTION

Figure 2:
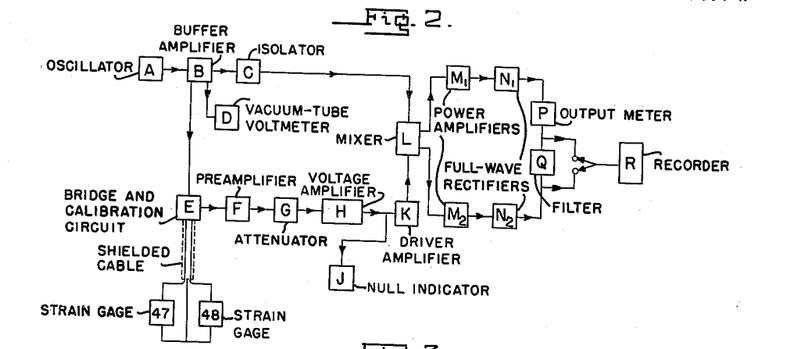
Figure 2 is a block diagrammatic view showing the electrical relationship of the several units of the carrier-type strain indicator.

The instrument comprises the several units shown in the block diagram, Figure 2. A sinusoidal oscillator A, whose frequency is 2,200 cycles per second, drives a buffer amplifier B and an isolator C. The magnitude of voltage delivered by the buffer amplifier is indicated by a vacuum-tube voltmeter D. The buffer amplifier B excites a bridge E whose output voltage is passed by a preamplifier F to an attenuator G. The output voltage from the attenuator G is amplified by a fixed-gain amplifier H. The amplified signal voltage from unit H is impressed on a null indicator unit J and also passes through a driver unit K to a mixer L. This mixer L also receives a voltage from the buffer amplifier B through the isolator C. The composite output voltage from the mixer L drives two independent power amplifiers $M^1$, $M^2$ operating into full-wave rectifiers $N^1$, $N^2$ respectively. Unit P is a zero-center milliammeter whose full-scale reading either side of center is five mils. Connected to the output is a simple high-pass filter Q shunted by a recording device R. The strain indicator is intended primarily for use with multi-channel recording oscillographs equipped with bifilar suspension or other types of galvanometers. Linear output current of five milliamperes in either polarity is available for driving a ten- to twenty-ohm load. Other types of recording or indicating devices may be used if their driving-power requirements are in this range. Higher currents may be consumed if some non-linearity can be accepted.

THE OSCILLATOR A

Figure 1:
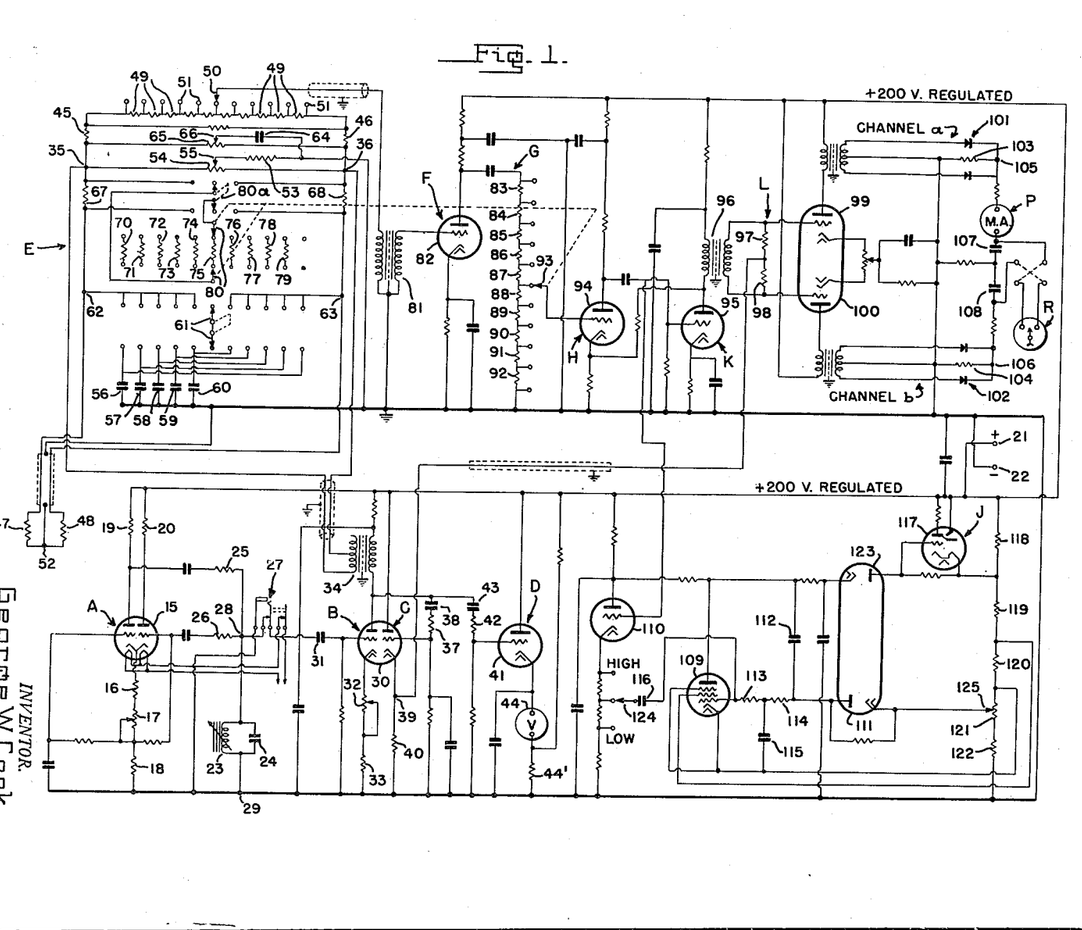
Figure 1 is a diagrammatic view of the complete electronic circuits for the carrier-type strain indicator.

The oscillator A was chosen because of its inherent simplicity in operating principle and because of its good frequency stability characteristics. It is a modification of the oscillator described in the Crosby Patent 2,269,417 and includes a double-triode cathode-coupled type 6SC7 amplifier 15. The common cathode load comprises a cathode resistor 16, a potentiometer 17 and another cathode resistor 18 connected in series. Two parallel plate resistors 19, 20 are also provided. The cathode-to-plate circuit is supplied with 200 volts from a source of regulated voltage through terminals 21, 22.

A major modification of the conventional cathode-coupled amplifier consists in isolating the coil 23 and condenser 24 of the "tank" by resistors 25, 26. It is imperative that the bridge-exciting voltage have good wave form; i. e., it should be substantially free from harmonic distortion because a practical A. C. bridge circuit cannot be perfectly balanced at fundamental and harmonic frequencies simultaneously. Virtual elimination of harmonic frequency components in the output voltage of the oscillator could be accomplished by using a sharply-tuned filter between the oscillator and the load; but a serious difficulty immediately arises. If the characteristics of the filter are sharp enough effectively to reduce harmonic terms in its output voltage to negligible quantities, rigid control must be imposed on the frequency of the oscillator; otherwise, continual amplitude variations will occur at the output of the filter as the oscillator frequency wanders. Rigid control of the frequency of oscillation is not ordinarily practical in small instruments of this kind, but the problem was solved by the resistance isolation of the "tank" coil-and-condenser combination, 23, 24, as previously mentioned. The "tank" serves as a filter, and simultaneously as the frequency-determining element in the oscillator circuit. Since the same element is employed for both purposes, the natural frequency of the filter and the natural frequency of the oscillator necessarily coincide.

Some test conditions require the use of two or more strain indicators on one test specimen with the gages and connecting leads proximate to each other. If each strain indicator operates with its own oscillator, the frequency of which is nearly the same as that of its neighbor's oscillator, spurious modulation caused by "beating" is produced at the respective outputs which is proportional to the degree of coupling between the gages and leads.

This undesirable modulation vanishes when all strain indicators are excited by a common oscillator. For connection to a common oscillator each instrument is provided with a suitable switch jack 27. When a plug is inserted in the jack 27, the built-in oscillator is disconnected automatically and the accessory oscillator is connected directly to the buffer amplifier B. The output of the built-in oscillator A is taken from points 28, 29 at opposite sides of the "tank" coil and condenser combination.

THE BUFFER AMPLIFIER B AND ISOLATOR C

A twin-triode type 6SN7 amplifier tube 30 is employed in the buffer amplifier B and the isolator C. Its cathode-to-plate circuits are energized by 200 volts from the source of regulated voltage through terminals 21, 22. The control grid of the buffer amplifier half of the tube 30; i. e., the left half as shown in Figure 1, is electrically coupled through a capacity 31 to the oscillator output terminal 28. The buffer amplifier cathode is connected to the oscillator output terminal 29 through a potentiometer 32 and a cathode resistor 33. The plate circuit of the buffer amplifier B is connected through a transformer 34 to the input terminals 35, 36 of the bridge E.

The other half of the twin-triode amplifier tube 30 serves as the isolator C and operates as a cathode-follower amplifier. Its control grid is electrically connected to the plate of the buffer amplifier B through a resistor 37 and a condenser 38. The output to the mixer circuit L is taken from a point 39 at the positive side of the cathode resistor 40.

THE VACUUM-TUBE VOLTMETER D

The vacuum-tube voltmeter includes a type 6J5 triode amplifier tube 41 having its control grid electrically connected through a resistor 42 and a condenser 43 to the buffer amplifier plate. A meter 44 in the cathode circuit of tube 41 at the positive side of the cathode resistor 44' indicates the magnitude of voltage supplied to the bridge E and mixer L.

THE BRIDGE CIRCUIT E

A fairly complex modification of the usual Wheatstone bridge circuit is employed in this instrument. This is an alternating-current bridge excited at its input terminals 35, 36 by output voltage of the buffer amplifier B acting through the transformer 34. Two adjacent arms of the bridge include 120-ohm precision resistors 45, 46. The other two arms include 120-ohm wire resistance strain gages 47, 48. The use of a carrier system is virtually essential to the extension of the low-frequency range of the instrument to zero. The strain indicator is designed to measure strains in a frequency range from zero to 200 cycles per second. The sensitivity of the instrument is such that good resolution of strains as low as eight microinches per inch may be obtained. The signal voltage from the bridge, when a strain of this magnitude is introduced, is about five microvolts. If a direct current were used to excite the bridge, a constant strain, i. e., a strain of zero frequency, would product a D. C. voltage output from the bridge. Uncontrollable variations in circuit parameters preclude the use of any known D. C. amplifying system at signal levels of this order.

Provision has been made for balancing the bridge for both resistance and reactance. The output voltage from such a bridge circuit is of course equal to zero while the bridge is in this balanced condition. The null indicator J serves to determine when this condition is established. A change in resistance in any arm of the bridge disturbs this balanced condition, and an output voltage develops at the output terminals of the bridge. This voltage is proportional to the degree of unbalance in the bridge.

The bridge circuit itself has no sense of direction; i. e., a resistance increment introduced in an arm of the bridge produces the same voltage output whether the increment represents a resistance increase or decrease. A sense of direction in the bridge could be obtained if the bridge were initially unbalanced. Of course, the degree of unbalance would have to be greater than the peak amplitude of the modulations produced by the strain being measured. There are several valid reasons, however, for not using the unbalanced bridge, one of them being a matter of convenience to the operator. A new unbalance would have to be established for each setting of the attenuator G; furthermore, the operator could not conveniently keep a constant check on the condition of balance of the bridge. Probably the most important reason for using the balanced bridge will appear when the output stage is discussed. For the moment let it be pointed out that it is desirable to obtain from the bridge only the sideband components of any modulation produced in the bridge.

Resistance balance in the bridge is accomplished in the following manner: Interposed between the resistors 45, 46 is a series of "rough control" bridge-balancing resistors 49. These are 0.585 ohm precision resistors; and one output terminal 50 of the bridge is selectively connectible between any two of the resistors 49 or at either end of the series, as by switch contacts 51. The other output terminal 52 of the bridge is connected through a resistor 53 to any one of a plurality of points along a vernier control resistor 54 across the input terminals 35, 36, as by a sliding contact 55. By examination of the simplified bridge circuit with resistance balance shown in Figure 4, it is clear that resistance balance can be accomplished by adjustment of the "rough control" contact 50 and the vernier control contact 55. The effectiveness of moving the vernier control from one extreme position to the other must of course be equal to or exceed the effectiveness of moving the rough control one step. A ten percent overlap is provided in this instrument.

The bridge is balanced for stray capacity effects in the following manner: Connected to the output terminal 52 are "rough control" bridge-balancing condensers 56—60 of graduated capacities any one of which is selectively connectible as by switch 61 to either of two points 62, 63 at opposite sides of the bridge. The output terminal 52 is also connectible through a condenser 64 to any one of a plurality of points along a vernier control resistor 65 across the input terminals 35, 36, as by a sliding contact 66. It will be noted by inspection of the simplified bridge circuit with reactance balance shown in Figure 5, assuming that resistance balance has been established, that a capacitance or reactance balance can be accomplished by adjustment of the "rough control" switch 61 and the vernier control contact 66. The effectiveness of moving the vernier control from one extreme position to the other overlaps the effectiveness of one step of the rough control by about ten percent. A precise degree of balance in the strain indicator bridge may be obtained by alternate manipulation of the resistance and capacitance compensating controls.

CALIBRATION METHOD

The built-in calibration equipment has an accuracy of ¼ of one percent or better when the gage factor is equal to 2 and the gage resistance is 120 ohms. The gage factor is the ratio of unit change in gage resistance to unit change in gage length; i. e., gage factor is equal to $\Delta R/R$ divided by $\Delta L/L$.

Of the several methods in general use for calibrating strain-measuring apparatus, the one which probably is most widely used consists of direct measurements of (a) the voltage gain of the amplifying apparatus, (b) the exact resistance of the gage, and (c) the magnitude of the exciting current in the gage. With the results of these three measurements at hand, the strain may readily be computed. If particular care is exercised in making these measurements, the only limitation on the accuracy of the calibration is the accuracy of the measuring devices used in these operations. The quantities involved in the computations must often be carried to several decimal places. Neglecting the time consumed in making these three measurements and in computing the results, it will be noted that there is a chance for human error in each of the four operations. Furthermore, several accessory pieces of apparatus are usually required to make the three essential measurements.

Another method which is widely used consists in operating on, or actually loading, the member on which a strain measurement is to be made, in a manner to produce predictable results. The object of such a calibration method is to produce a deflection or indication at the output of the strain-measuring apparatus with which the effect of applying an unknown load to the member may be directly compared. However, it is not always possible to load a structural member in a predictable manner. The use of strain-measuring apparatus depending on this type of calibration, consequently, is limited to test conditions where structural members can be thus loaded.

A method of calibration which is much more likely to produce satisfactory results consists in introducing a known resistance change in the gage circuit. This change can be introduced either by shunting the gage with another resistor whose resistance is accurately known, or by introducing a known resistance in series with the gage. Calibrating by shunting either presumes a prior knowledge of the exact resistance of the gage and the connecting wires or cable or requires the measurement of this total resistance at the time of calibration. It is seldom convenient to install a switching arrangement at the gage location, and for this reason most shunt-type calibration methods include the resistance of the cable with that of the gage. A somewhat cumbersome computation is always involved in this method, together with the bother of determining the gage-plus-cable resistance.

The series calibrating method, on the other hand, avoids the difficulties just mentioned. The absolute value of the gage-plus-cable resistance has little effect on the accuracy of the calibration, because the resistance change introduced in the arm of the bridge, by the calibration operation, is independent of the arm resistance. There are also possibilities for error in this method. For example, some strain-measuring apparatus is provided with a means for opening the gage circuit and inserting a known resistance. This scheme is quite usable if the resistance change thus introduced in the circuit is fairly large; but when the calibrating resistance to be inserted is of the order of a few thousandths of an ohm, the resistance of the switch contacts employed in the operation may have an effect comparable to that of the calibrating resistor being inserted.

Figures 6, 8A, 8B, 9A, 9B, 11A, 11B:
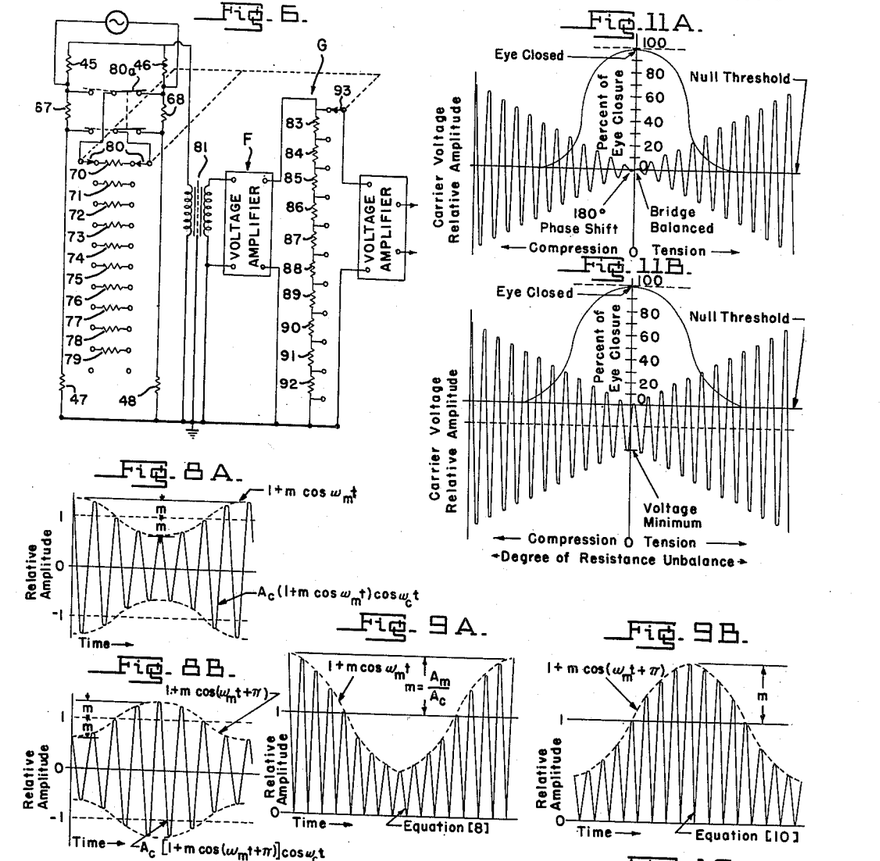
Figure 6 is a diagrammatic view of the alternating voltage bridge circuit in simplified form with its calibration system.
Figures 8A and 8B are graphs of the wave forms of the driving voltages for the two channels in the output stage of the strain indicator.
Figures 9A and 9B are graphs of the wave forms of the output voltages of the two channels in the output stage.
Figures 11A and 11B are graphs of the null detector indications as a function of bridge resistance unbalance when stray capacity is respectively, balanced, and not balanced.

The calibrating method used in the herein-described strain indicator is of the series type, but the switch contact resistance problem is solved by the arrangement shown in Figure 6. Two-ohm resistors 67, 68 are permanently connected in series each with a different one of the lower or gage arm resistors 47, 48 of the bridge. A resistance change may be produced conveniently in either of these bridge arms by shunting one or the other of these 2-ohm resistors 67, 68 with any one of ten calibrating resistors 70—79, as by a resistor selecting switch 80 and a double-pole double-throw switch 80a. These calibrating resistors have graduated values which are greater than that of the 2-ohm resistors 67, 68; and the switch contact resistance is now in series with a relatively large resistor. Thus any possible error due to switch contact resistance is reduced to one part in many thousands. When the calibration switch 80a is thrown in one direction, a decrease in resistance is introduced in series with one gage arm of the bridge. When it is thrown in the other direction, a resistance change is introduced in series with the other gage arm. The resistance change is practically identical for both conditions since the same calibrating resistor is used. The resultant deflection or indication on the recording device caused by these accurately known resistance changes may be directly compared with the deflection obtained by a strain in the specimen under observation. The bidirectional operation of this calibration method provides calibration indications which correspond to strains in either tension or compression. Calibration is accomplished in one simple operation; no accessory apparatus is involved; and no tedious measurements or computations are necessary.

THE PREAMPLIFIER F

The signal or unbalance voltage from the bridge output terminals 50, 52 is stepped up and amplified by a transformer 81 of high turn ratio and a preamplifier stage including a type 6SF5 triode amplifier tube 82.

THE ATTENUATOR G

Voltage from the preamplifier is impressed on a special attenuator G comprising ten odd-valued resistors 83—92 whose resistance values are directly related step by step to the series of calibrating resistors 70—79 in the bridge circuit. The range and sensitivity of the strain indicator as designed for use with 120-ohm wire resistance strain gages, and the values of the calibration and attenuator resistors for full-scale indications are shown in the table.

Table

VALUES OF CALIBRATION RESISTORS AND ATTENUATOR RESISTORS FOR FULL-SCALE INDICATION OF VARIOUS STRAINS

| Calibration Resistors | | Attenuator Resistors | | Strain, in Microinches per inch | Approximate Stress in Steel, p. s. i. |
|---|---|---|---|---|---|
| Reference Numeral | Resistance, in ohms | Reference Numeral | Resistance, in ohms | | |
| 70 | 414.7 | 83 | 16,670 | 40 | 1,200 |
| 71 | 275.8 | 84 | 13,330 | 60 | 1,800 |
| 72 | 164.7 | 85 | 6,667 | 100 | 3,000 |
| 73 | 109.1 | 86 | 5,333 | 150 | 4,500 |
| 74 | 64.67 | 87 | 3,000 | 250 | 7,500 |
| 75 | 39.68 | 88 | 1,667 | 400 | 12,000 |
| 76 | 25.74 | 89 | 1,333 | 600 | 18,000 |
| 77 | 14.68 | 90 | 666.7 | 1,000 | 30,000 |
| 78 | 9.126 | 91 | 533.3 | 1,500 | 45,000 |
| 79 | 4.682 | 92 | 800.0 | 2,500 | 75,000 |

If the calibrating resistor 70 having the greatest resistance, 414.7 ohms, is selected and the calibration switch 80a is operated, an unbalance voltage is developed across the bridge which has the same magnitude as that which would be produced if one of the gages 47, 48 were subjected to a strain of 40 microinches per inch. This is true because the shunting of a 2-ohm resistor with one of 414.7 ohms results in a resistance change of 9.6 milliohms, and this change is the same as that obtained by compressing a 120-ohm gage 40 microinches per inch when the gage factor is equal to 2. The design of the complete amplifying system is such that when this calibrating resistor 70 is used, full-scale deflection will be indicated on the recording device R if the attenuator switch 93 is disposed in its maximum-output position, as shown in Figure 6.

Now let the next calibrating resistor 71, of 275.8 ohms resistance, be selected. Operation of the calibration switch 80a will produce a resistance unbalance which is equivalent to a strain in one of the gages 47, 48 of 60 microinches per inch. The unbalance voltage from the bridge will, of course, be much larger than before. Unless the voltage gain in the amplifying system is reduced, the recording device R will be driven off scale. The resistance values in the attenuator are apportioned so as to permit uniform deflection on the recording device when the calibration switch 80a is operated, provided that the selector switch 80 and the attenuator switch 93 are kept in step, as by the ganging connections indicated by broken lines in Figures 1 and 6.

Thus it is feasible to designate the position of the attenuator in microinches per inch for full-scale deflection rather than in attenuation units, in voltage gain factors, or in abstract figures representing switch position. The designation of the attenuator position in units of strain presumes the use of 120-ohm gages with gage factors exactly equal to 2. When it is necessary to use gages with gage factors other than 2, a multiplying factor must be applied to indications in order to obtain exactness in test results.

The record is easily corrected in either of two ways: the output indications produced by the measured strain may be multiplied by the quantity 2/(actual gage factor), or the indication produced by actuation of the calibration switch may be multiplied by the quantity (actual gage factor)/2. Where multiple series-parallel gage combinations are employed and the gage factors are mixed, remedial measures are left to the ingenuity of the user.

THE OUTPUT CIRCUIT

The voltage amplifier H including the type 6SF5 tube 94, and the driver K including tube 95, ½ type 6SN7, are interposed between the attenuator switch 93 and a step-down transformer 96 which drives the mixer circuit L. A sacrifice in voltage gain in the transformer 96 is accepted for the purpose of reducing the impedance of the mixer circuit to a low level. As shown in Figure 1, a portion of the carrier voltage, which excites the bridge, is imposed in parallel, through resistors 97, 98 on the control grids of two power-amplifier tubes 99, 100. The output voltage of the driver amplifier K energizes the same two control grids differentially, through the mixer transformer 96. Borrowing terminology from the field of communications, this arrangement might be called an "injected carrier" system; but in a communications system the composite output voltages of the power amplifiers would be transmitted in combination to a demodulator.

In the herein described method of demodulation, however, the power amplifiers 99, 100 are split and operate independently. Each one drives its own full-wave rectifier 101, 102. The output voltage of each of these rectifiers 101, 102 consists of a series of adjoining half cycles, the familiar pattern obtained when a full wave rectifier operates on a sinusoidal wave. The rate of repetition is twice the carrier frequency or 4400 cycles per second.

The two rectifier output circuits are so arranged that they dissipate a fairly large current in their respective equal load resistors 103, 104. This condition is, of course, essential to the successful driving of a current-operated recording device. When the bridge is balanced, and no voltage is delivered to the mixer from the signal amplifier, equal voltages are impressed on these two load resistors 103, 104. The recording device R, which is connected to the two equipotential points 105, 106, normally records zero current transfer between the points.

When the bridge is unbalanced, for example by throwing the calibrating switch 80a in one direction, the output voltage of the signal amplifier combines with the carrier voltage from the oscillator A from point 39 of isolator C at the mixer L. The reaction is such that the effective driving voltage at the grid of one of the power-amplifier tubes 99, 100 is increased and that at the other grid is decreased. The resulting currents in the two rectifiers 101, 102 and their load resistors 103, 104 are no longer equal.

In the ensuing struggle to obey Kirchhoff's laws governing the behavior of electric currents in a network, the difference-current flows through the recording device R. This current is linearly related to the degree of unbalance in the bridge.

If the calibrating switch 80a is thrown in the other direction, the reaction in the mixer is reversed, and the current in the recording device is likewise reversed.

Thus the instrument has recovered a sense of direction and not only indicates accurately the magnitude of a resistance change in an arm of the bridge, but also resolves the change into either an increase or a decrease in resistance. This resolution may in turn be defined as strain in either tension or compression, as the case may be.

The simple high-pass filter Q comprising condensers 107, 108 which shunt the recording device serves to bypass a large portion of any ripple which may develop. The zero-center milliammeter P which is in series with the recording device provides a convenient means for reading the magnitude of a static strain and also furnishes a continual indication of the current in the recording device.

The conventional resistance-capacitance coupled amplifiers F, H, K issue spurious voltages to the mixer circuit which did not originate in the bridge. Some of this disturbance is introduced into the amplifier circuits as a result of the use of alternating current for filament heating. This effect is particularly noticeable in the early stage F of the amplifier. Thermal agitation, shot and flicker effects, and every day tube microphonics each contribute toward a conglomerate output voltage.

In general, these disturbing voltages have no appreciable frequency counterpart in the carrier voltage which is injected at the mixer L. Unless the frequency of a disturbing voltage approaches that of the carrier, it induces nearly equal current increases in the rectifiers and their load resistors. The recording device is scarcely affected by such currents because little difference-current is developed.

This desirable property of the herein described strain indicator makes it possible to obtain good clear records even though the input signal from the bridge is no more than a few microvolts. Also, the use of a bridge-exciting voltage far below that which is ordinarily used is feasible. With this reduction in bridge voltage, heating and distortion of the specimen by electric-power dissipation in the gages becomes a negligible factor. The importance of this point can be appreciated when one considers the difficulties encountered in the determination of very small strains in a specimen undergoing a continual process of dimensional creepage.

The full-wave rectifiers 101, 102 employed in the output stage are copper oxide contact rectifiers. Selenium rectifiers have also been successfully used. It is recognized that, in general, the non-linear characteristics of rectifiers of this type impair the accuracy of records obtained with their use. It may be pointed out that in the present strain indicator the output circuit is differentially driven. If reasonable care is used in matching these rectifiers, the non-linear characteristics are cancelled, or at least the undesirable effects are greatly reduced and are no longer a considerable factor.

A study of the behavior of the mixer circuit and output stage when the resistance in one or more arms of the bridge circuit is varied in a sinusoidal manner is of particular interest. This condition is often encountered when strain is measured in a structural member subjected to vibratory loading.

Figure 7:
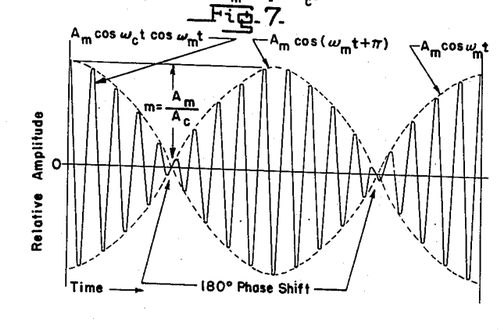
Figure 7 is a graph of the wave form at the output terminals of the bridge circuit when vibratory strain is measured.

Let the two strain gages 47, 48 of the bridge circuit be mounted on opposite faces of a bar and let this bar be set in sustained vibration so that the free end of the bar oscillates in a simple harmonic mode. It is assumed that the bridge circuit was first balanced for both resistance and reactance. Under these conditions the bridge is unbalanced first in one direction and then in the other. The excursions from balance are equal, sinusoidal in nature, and symmetrical about the initial balance point. The wave form of the resultant output voltage from the bridge is shown in Figure 7. The amplified replica of this voltage is impressed on the mixer circuit.

It can be shown that the voltage $e$ which is impressed on the mixer circuit by the amplifier is $$e = E_s k A \epsilon \quad (1)$$

where $E_s = E \cos \omega_c t$, the bridge exciting voltage,
$k$ is the gage factor,
$\epsilon$ is the instantaneous value of the strain in the bar,
$A$ is the voltage gain of the amplifying system,
$E$ is the maximum amplitude of thte bridge exciting voltage, and
$\omega_c$ is the angular frequency of the bridge exciting voltage.

Since the bar is oscillating in a sinusoidal manner $$\epsilon = \epsilon_m \cos \omega_m t \quad (2)$$

where $\epsilon_m$ is the maximum value of the strain in the bar, and
$\omega_m$ is the angular frequency of the bar vibration.

Since $k$, $A$, $E$ and $\epsilon_m$ are all constants, let their product be equal to an amplitude factor $A_m$ so that $$A_m = E k A \epsilon_m$$

Then $$e = A_m \cos \omega_c t \cos \omega_m t \quad (3)$$

By trigonometric manipulation, Equation 3 may be rewritten $$e = \frac{A_m}{2}[\cos(\omega_c + \omega_m)t + \cos(\omega_c - \omega_m)t] \quad (4)$$

This expression shows the complete absence of voltages of angular frequencies $\omega_c$ and $\omega_m$. The only components present in the wave are two side-band frequencies of equal amplitude, symmetrically spaced on a linear frequency spectrum either side of a mid-angular-frequency $\omega_c$.

Injection at this point of another voltage of amplitude $A_c$ and angular frequency $\omega_c$ produces a new total voltage $e_a$. The expression for this voltage may be written $$e_a = A_c \cos \omega_c t + \frac{A_m}{2}\cos(\omega_c + \omega_m)t + \frac{A_m}{2}\cos(\omega_c - \omega_m)t \quad (5)$$

Let $$\frac{A_m}{A_c} = m \text{ so that } A_m = A_c m$$

where $m$ is the degree of modulation or the modulation factor. Then Equation 5 may be rewritten $$e_a = A_c\left[\cos \omega_c t + \frac{m}{2}\cos(\omega_c + \omega_m)t + \frac{m}{2}\cos(\omega_c - \omega_m)t\right] \quad (6)$$

By trigonometric rearrangement and simplification $$e_a = A_c(1 + m \cos \omega_m t)\cos \omega_c t \quad (7)$$

This equation is the familiar expression for an amplitude-modulated carrier wave which is free from harmonic distortion.

The effective driving voltage $e_a$ for channel $a$ is impressed on the grid of the power amplifier tube 99. A similar voltage $e_b$ is impressed on the grid of the power amplifier tube 100 in channel $b$; however, the voltage $e_b$ has one point of difference: the modulation envelope is shifted 180° with respect to the modulation envelope of the voltage $e_a$. A direct comparison of the waveforms of these two voltages may be made by referring to Figures 8A and 8B.

As previously stated, the channels $a$ and $b$ operate independently into separate full-wave rectifiers and load resistors. The wave forms of the voltages impressed on these load resistors are shown in Figures 9A and 9B. The output voltage for channel $a$ may be expressed as $$e_{0_a} = A_a\left[\frac{2}{\pi} - \frac{4}{\pi}\sum \frac{\cos \beta \omega_c t \cos^2 \beta\frac{\pi}{2}}{\beta^2 - 1}\right][1 + m \cos \omega_m t] \quad (8)$$

where $\beta$ is the order of even harmonic and is successively equal to 2, 4, 6, 8 . . . , etc. (August Hund, "Über die Gleichrichtung von Stromen" (The Rectification of Currents), Electrotechnik und Maschinenbau, vol. 40, No. 4, January 1922.)

Equation 8 may be expanded thus:

$$e_{0_a} = \frac{2A_a}{\pi}\left[1 - \frac{2\cos 2\omega_c t}{1\times 3} - \frac{2\cos 4\omega_c t}{3\times 5} - \frac{2\cos 6\omega_c t}{5\times 7}\cdots\right](1 + m \cos \omega_m t) \quad (9)$$

The output voltage for channel $b$ may be expressed in a similar manner as $$e_{0_b} = A_b\left[\frac{2}{\pi} - \frac{4}{\pi}\sum \frac{\cos \beta \omega_c t \cos^2 \beta\frac{\pi}{2}}{\beta^2 - 1}\right][1 + m \cos(\omega_m t + \pi)] \quad (10)$$

Equation 10 may be expanded thus:

$$e_{0_b} = \frac{2A_b}{\pi}\left[1 - \frac{2\cos 2\omega_c t}{1\times 3} - \frac{2\cos 4\omega_c t}{3\times 5} - \frac{2\cos 6\omega_c t}{5\times 7}\cdots\right][1 + m \cos(\omega_m t + \pi)] \quad (11)$$

The amplitude coefficients $A_a$ and $A_b$ may or may not be equal, depending on the position of the meter zero-centering control. Again it will be noted that the wave forms of these two voltages differ only in the phase relationship of the modulation envelopes. This relationship is readily apparent in Figures 9A and 9B. The voltage $e_0$ which is impressed on the recording device is the difference between these two voltages; i. e.

$$e_0 = e_{0_a} - e_{0_b}$$

In the special case where $A_a = A_b = A_0$ $$e_0 = \left[\frac{2}{\pi} - \frac{4}{\pi}\sum \frac{\cos \beta \omega_c t \cos^2 \beta\frac{\pi}{2}}{\beta^2 - 1}\right]A_0 m[\cos \omega_m t - \cos(\omega_m t + \pi)] \quad (12)$$

$$= 2m A_0\left[\frac{2}{\pi} - \frac{4}{\pi}\sum \frac{\cos \beta \omega_c t \cos^2 \beta\frac{\pi}{2}}{\beta^2 - 1}\right]\cos \omega_m t \quad (13)$$

Figure 10:
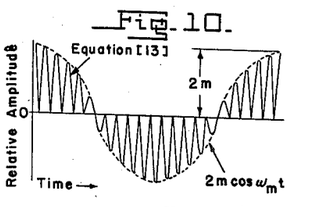
Figure 10 is a graph of the wave form at output terminals before installation of the high-pass filter.

The wave form expressed in this equation is shown in Figure 10. Equation 13 may be expanded thus:

$$e_0 = \frac{4mA_0}{\pi}\left[1 - \frac{2\cos 2\omega_c t}{1\times 3} - \frac{2\cos 4\omega_c t}{3\times 5} - \frac{2\cos 6\omega_c t}{5\times 7} \cdots\right]\cos\omega_m t \quad (14)$$

Equations 1 to 14 focus attention on several salient features in this carrier system. It is observed that modulation of the carrier is accomplished by the simple addition of three voltages: the carrier and two symmetrical side-band components. A voltage of the modulating frequency is not used in the process, nor is there resort to the use of conventional tuned circuits or other nonlinear elements. Theoretically, the use of this method for modulation results in a perfect modulating operation.

The dual demodulation of the carrier in the twin output stage provides for direct cancellation of even-harmonic distortion of the component of angular modulating frequency $\omega_m$. The net result of demodulation by this method is the accomplishment of a distortionless operation, insofar as this frequency is concerned. The truth of this last statement is, of course, dependent on exact symmetry in the electrical characteristics of the component parts which comprise the mixer and output circuits.

The suppression of one side band is known to introduce strong even-harmonic components in a modulated carrier wave. During the development of this carrier system, it was experimentally proved that either the upper or lower side band can be completely suppressed without noticeable distortion in the output indications. Almost all of the amplitude distortion arising in the amplifying system is cancelled by the differential action of the output stage in the process of demodulating the carrier.

Figures 3, 4, 5:
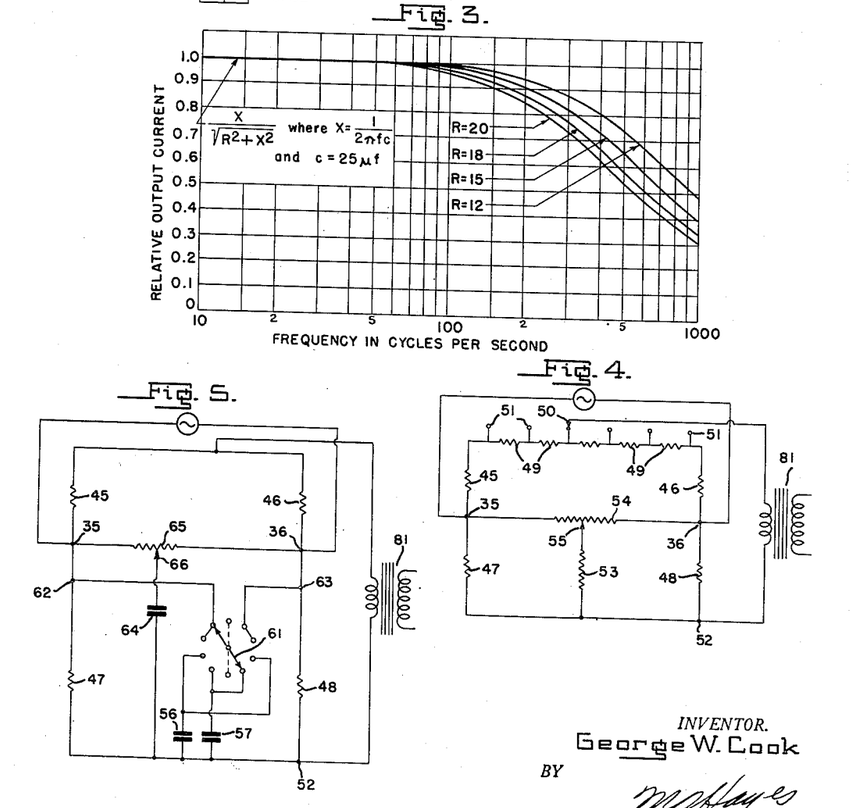
Figure 3 is a graph showing the output current as a function of frequency of alternation, when the carrier-type strain indicator is used to measure alternating strain of constant amplitude.
Figure 4 is a diagrammatic view showing the alternating voltage bridge circuit in simplified form with its resistance balancing means.
Figure 5 is a diagrammatic view showing the alternating voltage bridge circuit in simplified form with its reactance balancing means.

Amplitude distortion as a function of frequency is purposely introduced at the output terminals by the insertion of the high-pass filter Q in shunt with the recording device; see Figure 3 for response curve. This filter has no noticeable effect on the dual demodulators but serves only to reduce the response of the recording device at the ripple frequency.

The usable frequency range of the instrument is from zero to about 200 cycles per second. With some correction, however, higher frequencies can be used. The frequency range is influenced by the resistance of the recording galvanometer. If an alternating strain of constant amplitude is measured, the output current, as a function of the frequency of alternation, for four values of recording-galvanometer resistance, is as shown in Figure 3. Below ten cycles per second, the response is substantially uniform to and including zero frequency.

NULL DETECTOR J

A very simple experiment will establish the necessity for a null detector as an integral part of this instrument. Assume that the bridge circuit is initially balanced for both resistance and reactance and that the output current meter reads zero. Let a reactance unbalance be introduced in the bridge circuit by adjustment of one of the capacitance balancing controls. The output meter will no longer read zero. The resistance balancing controls may be adjusted so that the output meter again reads zero without disturbing the capacitance balancing controls. Now the bridge circuit is unbalanced for both resistance and reactance. Further capacitance unbalance and resistance readjustment can be made until the amplifying system is overloaded, but this condition is not indicated by the output meter.

Needless to say, the instrument is not usable for strain measurements while this condition exists. Attempts to restore the initial balanced condition in the bridge circuit are almost certain to fail unless some indicator other than the output meter is available, because the possible combinations of resistance and reactance unbalance that will induce zero current in the output meter are almost limitless.

The null detector J includes a 6SJ7-type high-gain pentode voltage amplifier 109 which is used in a special reflex circuit. The A.-C. components appearing at the grid of the mixer-driver tube 95 are impressed by a cathode-follower isolator 110 on the grid of the pentode amplifier tube 109. The amplified counterphase voltage at the plate of the pentode 109 is impressed on a half-wave rectifier diode 111 through condenser 112. The D.-C. component of this rectified voltage is passed through a simple resistance-capacitance filter network 113, 114, 115, the condenser 116 acting as the final by-pass condenser of the resistance-capacitance filter circuit, and is imposed as a biasing voltage on the grid of the same pentode amplifier tube 109. This biasing voltage changes the D.-C. plate current in the tube.

An electron ray indicator tube 117, commonly known as a "magic eye" tube, is employed as a visual indicator. The cathode of the indicator tube is fixed in potential with respect to ground by a bleeder network comprising resistors 118–122. This network is apportioned so that this potential is slightly positive with respect to the potential at the plate of the pentode when when no signal is impressed on its grid. Application of signal voltage to the grid of the pentode 109 induces a decrease in plate current, as previously mentioned, causing the plate to swing positive with respect to its previous potential position. The initial negative grid bias on the indicator tube 117 is thereby removed; whereupon the eye on the indicator tube opens. Destructive grid current in the indicator tube is prevented by non-conduction in the connecting diode 123 between the pentode plate and the grid of the indicator tube. When the signal voltage is removed or reduced to zero, such as by balancing the bridge circuit, the eye closes.

When the bridge is greatly unbalanced, the attenuator G in the amplifier may be adjusted to the least sensitive position, the null sensitivity control switch 124 in the null detector may be moved to "low," and the null threshold control contact 125 adjusted so as to compel the original potential relation between the pentode plate and the cathode of the indicator tube with consequent closure of the eye. By suitable adjustments of the bridge-balancing controls and backing off of the null threshold control, improvement in bridge balance is readily made. The attenuator G may be adjusted for greater sensitivity as this improvement progresses, until full sensitivity is used. Final adjustments are made with the null sensitivity control switch 124 in the "high" position.

The voltage gain of the reflex amplifier in the null detector J together with the voltage gain of the bridge signal amplifiers F, H, provide an over-all voltage gain of about 10 million times. A D.-C. voltage of 2.5 volts is required to actuate the eye of the indicator tube from "open" to "close."

Output voltages from the bridge of 0.05 microvolt are therefore discernible, and bridge balance may easily be accomplished to a high degree of accuracy. Figures 11A and 11B are graphical presentations of the relationship between bridge voltage output and null detector indications.

The reason the electron ray indicator is sensitive to bridge unbalance of either resistance or reactance while the output current meter P may give a zero reading under certain conditions is that the electron ray indicator is part of a circuit that measures absolute magnitude of voltage independent of phase and this circuit is energized ahead of the mixer circuit.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. In an electric measuring system, a Wheatstone bridge including four arms, a pair of input terminals and a pair of output terminals, at least one of the bridge arms including a variable impedance element, a source of carrier frequency voltage connected to the input terminals of the bridge so that any bridge unbalance will give rise to a bridge output voltage wave of said carrier frequency and of a magnitude and phase depending on the degree and sense of unbalance of the bridge, a mixer energized by said carrier frequency voltage and by oppositely polarized voltages derived from said bridge output voltage wave when said bridge is unbalanced, said mixer having dual outputs and being adapted to supply dual carrier frequency voltage waves differentially modulated by said oppositely polarized voltages, dual full-wave rectifier means separately demodulating the modulated outputs of said mixer, a pair of load resistors for separately dissipating the outputs of said demodulating means, and a galvanometer connected to said load resistors so as to measure any differential current flowing in said load resistors.

2. In an electric strain measuring system, a Wheatstone bridge including four arms, a pair of input terminals and a pair of output terminals, at least one of the bridge arms including a variable impedance strain element, a source of carrier frequency voltage connected to the input terminals of the bridge so that any bridge unbalance will give rise to a bridge output voltage wave of said carrier frequency and of a magnitude and phase depending on the degree and sense of unbalance of the bridge, an amplifier for the bridge output voltage wave which issues, in addition to the amplified bridge output voltage wave, spurious signal voltages not originating in the bridge, said spurious voltages in general having no frequency counterpart in the carrier voltage, a mixer energized by said carrier frequency voltage and by oppositely polarized voltages derived from said bridge output voltage wave when said bridge is unbalanced, said mixer having dual outputs and being adapted to supply dual carrier frequency voltage waves differentially modulated by said oppositely polarized voltages, dual full-wave rectifier means separately demodulating the modulated outputs of said mixer, a pair of load resistors for separately dissipating the outputs of said demodulating means, and a galvanometer serially connected with said load resistors for measuring any differential current flowing in said load resistors.

3. An electric strain measuring system according to claim 2, provided with means for balancing the bridge for resistance, means for balancing the bridge for reactance, and a null indicator for detecting unbalance of the bridge for resistance or reactance separately or combined including a voltage indicator for measuring absolute magnitude of voltage independent of phase, said voltage indicator being energized by the bridge output ahead of the mixer.

4. An electric strain measuring system according to claim 2, provided with means for balancing the bridge for resistance, means for balancing the bridge for reactance, a null indicator for detecting unbalance of the bridge for resistance or reactance separately or combined including a voltage indicator for measuring absolute magnitude of voltage independent of phase, said voltage indicator being energized by the bridge output ahead of the mixer, and an adjustable attenuator for selectively varying the bridge output delivered to said voltage indicator.

5. In an electric strain measuring system, a Wheatstone bridge including four arms, a pair of input terminals and a pair of output terminals, at least one of the bridge arms including a variable impedance strain element, a source of carrier frequency voltage connected to the input terminals of the bridge so that any bridge unbalance will give rise to a bridge output voltage wave of said carrier frequency and of a magnitude and phase depending on the degree and sense of unbalance of the bridge, an amplifier for the bridge output voltage wave which issues, in addition to the amplified bridge output voltage wave, spurious signal voltages not originating in the bridge, said spurious voltages in general having no frequency counterpart in the carrier voltage, a mixer energized by said carrier frequency voltage and by oppositely polarized voltages derived from said amplified bridge output voltage wave when said bridge is unbalanced, said mixer having dual outputs and being adapted to supply dual carrier frequency voltage waves differentially modulated by said oppositely polarized voltages, a pair of amplifiers respectively connected to the mixer outputs, dual full-wave rectifier means separately demodulating the dual output voltages of said pair of amplifiers, a pair of load resistors for separately dissipating the outputs of said demodulating means, and a galvanometer serially connected with said load resistors for measuring any differential current flowing in said load resistors.

6. In an electric strain measuring system, a Wheatstone bridge including four arms, a pair of input terminals and a pair of output terminals, at least one of the bridge arms including a variable impedance strain element, a source of carrier frequency voltage connected to the input terminals of the bridge so that any bridge unbalance will give rise to a bridge output voltage wave of said carrier frequency and of a magnitude and phase depending on the degree and sense of unbalance of the bridge, an amplifier for the bridge output voltage wave which issues, in addition to the amplified bridge output voltage, spurious signal voltages not originating in the bridge, said spurious voltages in general having no frequency counterpart in the carrier voltage, a pair of amplifiers, a mixer including means introducing said carrier frequency voltage in parallel to said pair of amplifiers and means differentially modulating said parallel carrier frequency voltages with oppositely polarized voltages derived from said bridge output amplifier, dual full-wave rectifier means separately demodulating the output voltages of said pair of amplifiers, a pair of load resistors for separately dissipating the outputs of said demodulating means, and a galvanometer serially connected with said load resistors for measuring any differential current flowing in said load resistors.

7. In a measuring system, a normally balanced Wheatstone bridge including a gage arm, gage calibrating means for introducing any one of a plurality of resistance changes in the gage arm to unbalance the bridge including a plurality of calibration resistors of graduated resistance values and a calibration switch for selectively connecting any one of said calibration resistors with the gage arm, an attenuator comprising a plurality of resistors serially connected to the output of said bridge, attenuator switching means for selecting an attenuator output voltage corresponding to the voltage drop across any number of said plurality of attenuator resistors, the resistance values of said attenuator resistors being so related to those of said calibration resistors respectively that output signals of substantially the same magnitude may be obtained from the attenuator for the various degrees of bridge unbalance produced by different settings of said calibrating switch.

8. In a measuring system according to claim 7, said attenuator switching means being ganged to operate in step with the calibrator switching means whereby output signals of substantially the same magnitude are automatically obtained for various settings of the calibrating switch.

9. In a measuring system a normally balanced Wheatstone bridge including two adjacent gage arms, gage calibrating means for introducing any one of a plurality of resistance changes in any one of said gage arms to unbalance the bridge including a plurality of calibration resistors of graduated resistance values and calibration switching means for selectively connecting any one of said calibration resistors with any one of said gage arms, an attenuator comprising a plurality of resistors serially connected to the output of said bridge, attenuator switching means for selecting an attenuator output voltage corresponding to the voltage drop across any number of said plurality of attenuator resistors, the resistance values of said resistors being so related to those of said calibration resistors respectively that output signals of substantially the same magnitude may be obtained from the attenuator for the various degrees of bridge unbalance produced by different settings of said calibrating switch.

10. In a measuring system, a normally balanced Wheatstone bridge including a gage arm comprising a gage resistor and a fixed resistor of a known small resistance permanently connected in series with the gage resistor, a plurality of calibration resistors of graduated resistance values which are large relative to the resistance value of said fixed series resistor, said bridge having input terminals connected to a source of current, means switching any one of said calibration resistors into and out of shunting relation to said fixed resistor, an attenuator comprising a plurality of resistors serially connected to the output of said bridge, attenuator switching means for selecting an attenuator output voltage corresponding to the voltage drop across any number of said plurality of attenuator resistors, the resistance values of said attenuator resistors being so related to those of said calibration resistors respectively that output signals of substantially the same magnitude may be obtained from the attenuator for the various degrees of bridge unbalance produced by different settings of said calibrating switch.

11. In a measuring system, a normally balanced Wheatstone bridge including two adjacent gage arms, each gage arm including a gage resistor and a fixed resistor of a known small resistance permanently connected in series with the gage resistor, a plurality of calibration resistors of graduated resistance values which are large relative to the resistance value of said fixed series resistors, said bridge having input terminals connected to a source of current, means switching any one of said calibration resistors into and out of shunting relation to any one of said fixed series resistors, an attenuator comprising a plurality of resistors serially connected to the output of said bridge, attenuator switching means for selecting an attenuator output voltage corresponding to the voltage drop across any number of said plurality of attenuator resistors, the resistance values of said attenuator resistors being so related to those of said calibration resistors respectively that output signals of substantially the same magnitude may be obtained from the attenuator for the various degrees of bridge unbalance produced by different settings of said calibrating switch.

GEORGE W. COOK.

REFERENCES CITED

The following references are of record in the file of this patent:

UNITED STATES PATENTS

| Number | Name | Date |
| --- | --- | --- |
| 2,338,732 | Nosker | Jan. 11, 1944 |
| 2,400,571 | Olesen | May 21, 1946 |
| 2,423,867 | Zener | July 15, 1947 |
| 2,445,880 | Hathaway | July 27, 1948 |
| 2,484,164 | Hathaway | Oct. 11, 1949 |

OTHER REFERENCES

Pub. entitled "Technique and Appareils" in Mesures, Jan. 1948.

Pub. entitled "A Twelve-Channel Recorder for use with Resistance Strain Gauges" in Journal of Scientific Instruments, Sept. 1, 1947.

Pub. entitled, "Strain Gages" in Electronics, Dec. 1943.

Pub entitled, "Resistance Wire Strain Gage Equipment for Static and Dynamic Testing" in Product Engineering, Sept. 1945.